United States Patent
Richter et al.

(10) Patent No.: US 9,141,148 B2
(45) Date of Patent: Sep. 22, 2015

(54) MOBILE COMMUNICATION DEVICE AND INPUT DEVICE FOR THE SAME

(75) Inventors: Wolfgang Richter, Starnberg (DE); Roland Aubauer, München (DE)

(73) Assignee: MICROCHIP TECHNOLOGY GERMANY GMBH, Gilching (DE)

( * ) Notice: Subject to any disclaimer, the term of this patent is extended or adjusted under 35 U.S.C. 154(b) by 383 days.

(21) Appl. No.: 12/532,859

(22) PCT Filed: Mar. 26, 2008

(86) PCT No.: PCT/EP2008/002384
§ 371 (c)(1),
(2), (4) Date: Jan. 7, 2010

(87) PCT Pub. No.: WO2008/116642
PCT Pub. Date: Oct. 2, 2008

(65) Prior Publication Data
US 2010/0102941 A1    Apr. 29, 2010

(30) Foreign Application Priority Data

Mar. 26, 2007    (DE) .......................... 10 2007 016 408

(51) Int. Cl.
*G09B 21/00* (2006.01)
*G06F 1/16* (2006.01)
(Continued)

(52) U.S. Cl.
CPC .............. *G06F 1/169* (2013.01); *G06F 1/1626* (2013.01); *G06F 3/017* (2013.01); *G06F 3/0346* (2013.01); *G06F 3/03547* (2013.01); *G06F 3/044* (2013.01); *H04M 2250/52* (2013.01)

(58) Field of Classification Search
USPC ....................................................... 340/407.2
See application file for complete search history.

(56) References Cited

U.S. PATENT DOCUMENTS 4,334,280 A * 6/1982 McDonald .................... 708/136
(Continued)

FOREIGN PATENT DOCUMENTS

JP    2006010489 A    1/2006    ............. G01B 11/00
(Continued)

OTHER PUBLICATIONS

Second Chinese Office Action with English translation. Chinese Patent Application No. 200880015897.8, 21 pages, Jul. 20, 2012.
(Continued)

*Primary Examiner* — Naomi Small
(74) *Attorney, Agent, or Firm* — Slayden Grubert Beard PLLC

(57) ABSTRACT

The invention relates to a mobile communication device and an input device provided for operating said communication device by means of which input operations necessary for using the communication device may be carried out. The aim of the invention is to provide solutions by means of which it is possible, in particular for relatively compact mobile electronic devices, in particular communication devices and digital cameras to carry out said input operations in a manner which is particularly easy to coordinate for the user. According to a first aspect of the invention, the above is achieved by means of a mobile communication device with a housing arrangement which is designed to be held in one hand, a display device, included in the housing arrangement to provide an image reproduction surface, a control device for controlling the display device such that in an input mode the above provides an input graphic, which supports the carrying out of an input process and an input device for carrying out the input process according to input processes of a manual type, wherein said device is characterized in that the input device is designed such that an input zone is provided in a region apart from the display device on an operative manipulation of the device, within which input operations can be carried out by a user, wherein the user carries out control actions with his free hand with relation to the housing device without, in the process, touching the display device or the communication device with this hand.

27 Claims, 5 Drawing Sheets

Figure 1:
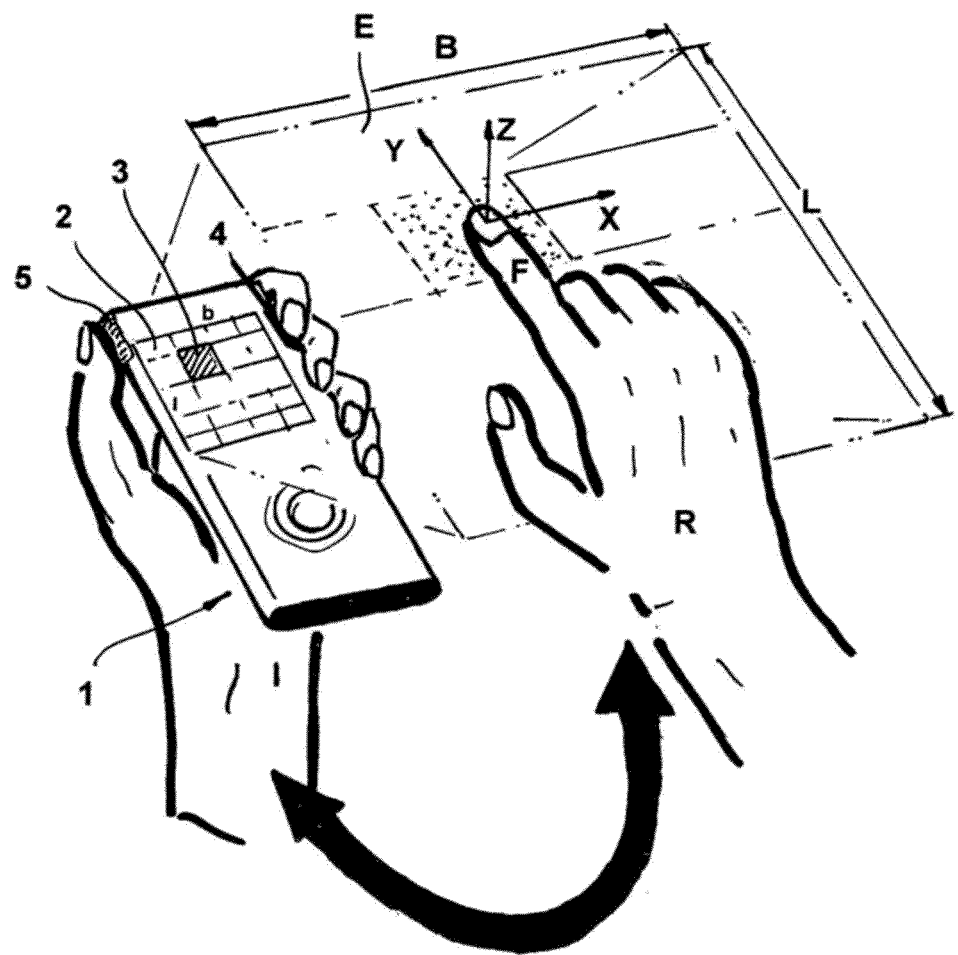

(51) Int. Cl.
*G06F 3/01* (2006.01)
*G06F 3/0346* (2013.01)
*G06F 3/0354* (2013.01)
*G06F 3/044* (2006.01)

(56) References Cited

U.S. PATENT DOCUMENTS

| | | | |
|---|---|---|---|
| 6,326,564 B1* | 12/2001 | Komatsu et al. | 178/18.01 |
| 6,720,863 B2* | 4/2004 | Hull et al. | 340/7.51 |
| 6,859,141 B1* | 2/2005 | Van Schyndel et al. | 340/562 |
| 2003/0127308 A1* | 7/2003 | Chen et al. | 200/310 |
| 2004/0193413 A1* | 9/2004 | Wilson et al. | 704/243 |
| 2005/0055209 A1* | 3/2005 | Epstein et al. | 704/255 |
| 2005/0088416 A1* | 4/2005 | Hollingsworth | 345/173 |
| 2005/0110771 A1* | 5/2005 | Hall et al. | 345/173 |
| 2006/0161871 A1* | 7/2006 | Hotelling et al. | 715/863 |
| 2006/0267966 A1 | 11/2006 | Grossman et al. | 345/179 |
| 2007/0229376 A1* | 10/2007 | Desclos et al. | 343/718 |
| 2008/0028868 A1* | 2/2008 | Konzelmann et al. | 73/861.25 |
| 2008/0059915 A1* | 3/2008 | Boillot | 715/863 |

FOREIGN PATENT DOCUMENTS

| | | | |
|---|---|---|---|
| WO | WO 9016045 A2 * | 12/1990 | |
| WO | WO 2006054207 A1 * | 5/2006 | |
| WO | 2006/107245 A | 10/2006 | G06F 3/033 |

OTHER PUBLICATIONS

Korean Office Action, Application No. 1020097022307, 10 pages, Jan. 21, 2014.

International Search Report and Written Opinion, Application No. PCT/EP2008/002384, 10 pages, Jun. 24, 2009.

* cited by examiner

MOBILE COMMUNICATION DEVICE AND INPUT DEVICE FOR THE SAME

CROSS REFERENCE TO RELATED APPLICATIONS

This application is the US national phase of PCT application PCT/EP2008/002384, filed 26 Mar. 2008, published 2 Oct. 2008 as WO2008/116642, and claiming the priority of German patent application 102007016408.6 itself filed 26 Mar. 2007, whose entire disclosures are herewith incorporated by reference.

The invention relates to a mobile communication device as well as an input device provided for the operation of this communication device, by means of which input operations necessary for the use of the communication device can be processed.

Moreover the invention is also related to a process for the execution of input operations on mobile small electronic devices like the mentioned mobile phones and digital cameras.

Mobile phones and digital cameras are typically equipped with key fields and/or input buttons as well as, if necessary, also with touch screen input devices, by which the input operations necessary for the operation of these devices can be done.

Especially in extremely small embodiments of these devices there is the problem that the realization of the input processes in part requires a considerable amount of fine motor coordination, which by certain users or in numerous situations can be provided to only a limited extent or in certain application situations reduces the attention for other processes.

In view of this problem the invention is based on the task to create solutions by which it becomes possible, especially in case of relative compact mobile electronic devices, especially communication devices and digital cameras, to handle these input operations in a way that the user can coordinate them particularly well.

According to a first aspect of the present invention this task according to the invention is resolved by a mobile communication device with the characteristics indicated in claim 1.

In this way it is possible in an advantageous way to advantageously handle the necessary delicate input processes even by relative gross motor movement of the user hand provided for the input operation.

According to a particular aspect of the present invention the controller is configured in such a way that the input events generated by the control movements done by the user are reflected in the user interface represented by the display. For example it is possible in particular to indicate on the user surface cursor structures or other symbols, or to generate graphic effects, the presence or movement of which corresponds with the input movement of the user.

The user interface can especially be formed in such a way, that by a transverse movement of the input hand different buttons or fields visualized in the user interface can be selected. The user interface can be configured moreover also in the way that beyond the resolution of the transverse movement also the lengthwise movement as well as preferably also the depth movement can be detected. By the detection of the transverse and lengthwise movement it is possible to move bidimensionally in a certain menu window. By the detection of the depth movement it is possible especially to obtain access to different menu windows. The user interface moreover can be configured in such a way that the selection processes are generated by striking movements of the hand, especially by striking changes of the Z axis information. Moreover it is also possible to detect determined gestures, and to deduce the selection of the user interface, or also certain other commands, from these gestures.

According to a particular aspect of the present invention the system is preferably configured in such a way that the operational area at least as for its width and/or height is greater than the width and/or height of the graphic surfaces rendered by the display, as well as preferably also greater than the communication device itself.

By means of the longitudinal and transverse movements preferably one can navigate inside a window or a frame. The system can moreover be formed in such a way that based on the detection events a selection command is derived.

This selection command can be generated especially by a finger gesture, especially by tilting the forefinger or also several fingers towards the display. This corresponding selection command can be generated based on the electric-field changes typical for this process in the detection range. On the device preferably an input structure is provided, by means of which beyond the hand movement based input operation without contact also a menu item selection by corresponding actuation of this input structure, especially input buttons, can take place.

This input structure can be executed as a key structure, which can be operated in case of seizing as intended the mobile communication device, especially by the thumb and the fingers of the user's left hand (right-hand version), or by accordingly thumb and fingers of the right hand (left-hand version).

Especially it is possible to arrange this selection button in such a way that it can be operated in an ergonomically advantageous way by the thumb or the forefinger.

The communication device according to the invention can be formed in such a way that the detection of the input operations takes place in a field-electrical way.

In particular it is possible to integrate the body of the user as such into the signal transmission system, for example by coupling, by means of the back side of the communication device, a sliding current event into the user, that is induced by corresponding modulation of the tension on electrodes provided in the rearward area of the device. The reconduction of this sliding current event in the area in front of the display of the communication device can be detected again by detection electrodes integrated into the mobile communication device.

According to a particular aspect of the invention it is also possible to form the mobile communication device or the camera in such a way that within the input operations an acoustic feedback is generated, for example by generating noises typical for switching (keyboard noises), or if necessary also a haptic feedback by corresponding actuators equipped with accelerating mass systems. By the display or also further optical means, especially light-emitting diodes, additional optical information can be generated, e.g. feedback information on finished input processes.

The total signal structure can be configured in such a way that the movement or execution of the input operations also considers so-called ballistic effects, so that by quickly shifting the operating hand the cursor in the corresponding window covers larger stretches and accordingly culminates into a ballistic function (thus retarded by a negative acceleration factor a). Preferably the detection field is of such a size that it covers an area of ca. 23×23 cm, since in this area a particularly rapid movement the operating hand by tilting in the wrist area and slight turn around the elbow joint can be reached.

It is advantageously possible to integrate into the mobile communication device a voice recognition system, by which a detection and conversion from language signals into text can take place. This text can then be inexpensively transmitted for example as contents of e-mails or SMS.

According to a particular aspect of the present invention this voice recognition system is used for conversion and detection of the gestures. The invention insofar also relates to a process for processing input signals that are generated as such in accordance with hand gestures that are executed by an user towards a detection system integrated into the mobile communication device, and correlate with the spatial movement of the hand or its fingers, wherein the input signals are generated or transformed in such a way that they represent transfer signals the waveband of which detects the waveband of the sound signals accessible to a voice recognition system, wherein the interpretation of the hand gestures by the voice recognition system takes place on the basis of those transfer signals.

In this way also a gesture detection and evaluation is possible in an advantageous way, using well proven circuit and evaluation systems developed for the field of speech recognition. Applications are possible, in which the concepts and chip sets developed for speech recognition are used exclusively for gesture interpretation. Moreover it is possible to implement voice recognition systems additionally with the function of gesture detection, in which the microphone entry also can act directly as entry for the gesture signals. The concept according to the invention of the conversion of gesture path processes into sound-like sequences can be realized in diffused computer systems and other systems into which speech recognition can be implemented, especially microprocessors, with relative small expenditure as to auxiliary hardware. The sound-like sequences generated according to the invention can be generated in such a way that they where applicable in superposition with microphone signals are coupled into the acoustic entry of the system. By this concept it is possible to extend speech recognition programs in a particularly advantageous way by gesture interpretation functions. The detection electrodes for gesture recording, or for detecting the spatial movement of the gesture hand, or where applicable also only that of fingers, can be integrated especially into the housing of the mobile communication device, or a headset or a hands-free kit, or a peripheric telephone system, so that a typical reference point for gesture detection is given. In vehicle hands-free headsets especially structures in the area of the dashboard, of the steering wheel, the central console and the door panels are suitable.

The sensor device according to the invention can also be formed in such a way that by it predominantly static gestures, e.g. static hand forms, can be detected and converted into sound sequences sufficiently clear for this purpose. Such static gestures can be executed for example as "flat hand", "fist with stretched thumb", "Victory sign". In case of these static gestures, based on the sensor signals generated during the static phase, a certain sound sequence can be generated.

It is also possible to represent by sounds the moving process typical for forming and removing the static gestures, and to consider it in the detection of these gestures.

By the conversion of the trajectory signals correlating with the gesture into sound-like signal sequences is made possible also a transmission of the gesture information by telecommunication systems and VOIP systems inside the sound data frequency range. The gesture information can be made available using language transmission systems also at a place far away from the operator, i.e. the gesticulating user. By the concept according to the invention a conversion or transmission of a hand gesture language into a sound language can also take place.

Identification models for the single gestures can be calculated by teaching processes or also for certain path processes, and be deposited for evaluation.

According to the invention gestures that originate from living beings (preferably humans) are detected with the help of a detector and converted into tone sequences (sound sequences). These then can be analyzed and evaluated with current methods of language or tone sequence processing. Verbal spoken commands can arrive where applicable parallel to this by the same channel in the same processing and can be evaluated with the gestures jointly, individually, or one after the other.

Preferably the tone sequences generated by the gesture identification circuit are generated in the same waveband as the voice input, so that also the filter methods of speech processing can be used. It is however also possible to choose another frequency range, for example one displaced towards the edge zone of the processed frequency range. Similarly or in the same way as language commands then can be gestures can be taught to the system and in case of their recurrence be executed in functions that are stored e.g. in a table. So apart from the gesture-tone sequence converter the same hardware and software can be used as in speech processing, which means an economic and circuit design advantage compared to separated working systems. The respective gestures can be carried out in front of a detection device three dimensionally in a certain time interval and are to a great extent independent from the user.

Basically the concept according to the invention is suitable for various techniques of gesture detection, like optical, capacitative or image-processing techniques. Advantageously the determination of the gestures is done in sequences and for every sequence a certain tone can be generated. Thus a simple or complex gesture generates a more or less persisting different tone sequence. Since never anybody can input the same gesture twice precisely, the system preferably presents a tolerant detection. This preferably happens based on a program. A software suitable for this purpose can be provided according to the invention using the identification and interpretation procedures provided in speech processing systems, especially when the tone sequence correlating according to the invention with the gesture, especially the gesture path, has a similar form as a spoken word or a sentence.

Reception of the Gesture Signals

The reception of the gesture signals is done preferably with the help of one or several capacitive (E-field) sensors. These sensors are preferably structured in such a way that they detect changes in an artificially generated electric field and as a consequence thereof deliver signals that correlate sufficiently closely with the position or movement of the hand or a finger.

Preferably a preprocessing of the gesture signals is done. This preprocessing advantageously can be synchronized with a gesture already recognized.

The gesture detection can take place by splitting up/demultiplexing the signal delivered by the respective sensor or during the preferred use of several sensors—the signals.

The interpretation of the gestures is done preferably in that sensor signals for at least two, preferably three space coordinates are generated. These sensor signals are obtained preferably in a multichannel measuring system, wherein the sensor signals can be detected on multiple channels parallel or in the time-division multiplex. An excitation in the time-division multiplex of the system or also frequency multiplexing are also possible.

The shift of the carrier-modulated (electrode reception) signals of the various sensor-channels can take place especially by envelope detection or rectification and low pass filtering (displacement frequency<low pass frequency<carrier frequency) into received low frequency signals, whose amplitude is proportional to the approach to/moving away from the reception sensor.

It is possible to recognize a beginning of a gesture and an end of a gesture with the help of one of or combinations of the following processes:

a) approximation detection: as gestures are detected the signals of the E field sensors in which at least one sensor signal exceeds or falls below a certain or an adaptively autoadjusting level.

b) motion detection: as gestures are detected signals of the E field sensors with a minimum change speed. For this purpose it is advantageous to form the mathematical derivation of this signals. Alternatively it is also possible to perform a high-pass filter filtration that corresponds to the derivation.

c) The aforementioned measures according to a and b can also be carried out in combination.

According to a particularly preferred embodiment of the invention a normalization of the gesture signals is done, e.g. by subtracting the temporal average or the direct signal component of all sensor signals from the respective single sensor signals.

Moreover co-ordinate transformation of the detected sensor signals is possible, so that the corresponding gestures are illustrated in a spatial reference plane.

This reference gesture plane preferably substantially lies in parallel with the electrode surfaces and perpendicular to the sensor axis, so that the corresponding gestures are always visualized in a certain distance from the sensor origin. The center of mass of the area stretched by the gesture lies advantageously on the sensor axis.

The conversion of the multidimensional sensor signals thus transformed is done preferably by a tension-frequency conversion (e.g. VCO) into suitable tone sequences that lie in the language frequency range of typically 50 Hz-8000 Hz or 300-3400 Hz (telephone band area), so that the various (typically 3) sensor signals are converted into one only gesture signal to be evaluated (1 channel). This is made available to the gesture detector in the next step for evaluation.

The sensor signals can be generated as time-division multiplex-signals. The conversion or transformation of the sensor signals by means of VCO conversion preferably leads to signals in each time different frequency bands in the language frequency range.

Gesture Detection

The detection of the gestures is done preferably using a DTW (Dynamic Time Warping) sample detector for detection of whole gestures, analogously to the word recognition in language detectors. These detector types are characterized by a selectivity sufficient for numerous application cases as to similarly executed gestures and thus an identification rate that is sufficient in case of a smaller gesture spectrum with relative striking gestures.

As an alternative to the aforementioned approach of DTW pattern recognition it is also possible to use a process that is also well-known as speech recognition concept Hidden Markov model (HMM) detector. In this type of speech recognition words are broken up in phonemes, atomic quasistationary sounds of the language. Analogously gestures are broken up in gesture fragments that are represented in the HMM by statuses. As gesture fragments can be used any part of a gesture, thus any gesture, preferably finger/hand/arm. Especially rectilinear or bent movements, changes of orientation (e.g. turning the hand), changes of the form (as opening the hand), as well as forms derived to any extent and integrated of these changes (length of movements, speeds, etc). These gesture fragments are individually one after the other detected and of the HMM detector again the defined (in a training or description process) total gestures assigned (for this example: L gesture).

The signals generated according to the invention as sound-like signal sequences and correlating with the hand gesture can be evaluated also by a neuronal network detector and gesture fragment classifier, analogously to the speech recognition (Phonem Classifier).

The aforementioned measures, as well as other diffused language recognition processes can also be executed in combination, in order to evaluate gesture signals generated according to the invention as sound-like signal sequences, and to interpret them.

3 Distinction of Training and Detection Phase,

The gestures to be detected are trained preferably at least once, where applicable also several times, and deposited as master sample in the gesture detector. Gestures with the same meaning, that are found to be too different however in the training, are preferably rejected. Not rejected, sufficiently similar and thus precise gestures can be summarized by averaging the corresponding reference signals.

As an alternative to the training process, also a graphic—e.g. based on mouse/menu—input of reference gestures can take place (arrow from the right to the left, from top to bottom, circle, etc). To these input gestures the accordingly expected sensor signals can be determined and be deposited as a master sample in the gesture detector.

Identification Phase

During the identification phase preferably the gesture signals are compared with the reference signal model deposited in the training/description process, and the most probable gesture is emitted. If the gesture signals differ too much from all reference signals, "not recognized" is emitted. Here depending on the deviation a threshold value can be defined, with which the probability for missed detections (the recognized gesture is wrongly assigned) and erroneous rejection (in English Miss) (a gesture is not detected and refused), depending on the application, can be adapted.

In case of a HMM detector the search for the best gesture is done advantageously by a Viterbi algorithm.

By the concept according to the invention it is possible to lead gesture signals to a voice recognition system and evaluate them in a surprisingly efficient way by the recognition processes already developed for speech recognition.

The sensors using low frequency electric fields (E-field sensors) in the area up to ca. 100 kHz makes possible a safe detection from movements at a distance of typically as far as 50 cm from the corresponding detection electrodes.

For a spatial illustration of the gesture preferably at least three electrodes are used, which for example each deliver three sound contributions correlating with the dynamics of the distance change. In order to especially also recognize the form of the hand, and to increase resolution altogether, and to create, where applicable, a certain redundancy, it is advantageous to use more than three electrodes, and thus to create a system that is overdetermined as to the coordinates if need be.

Figure 2:
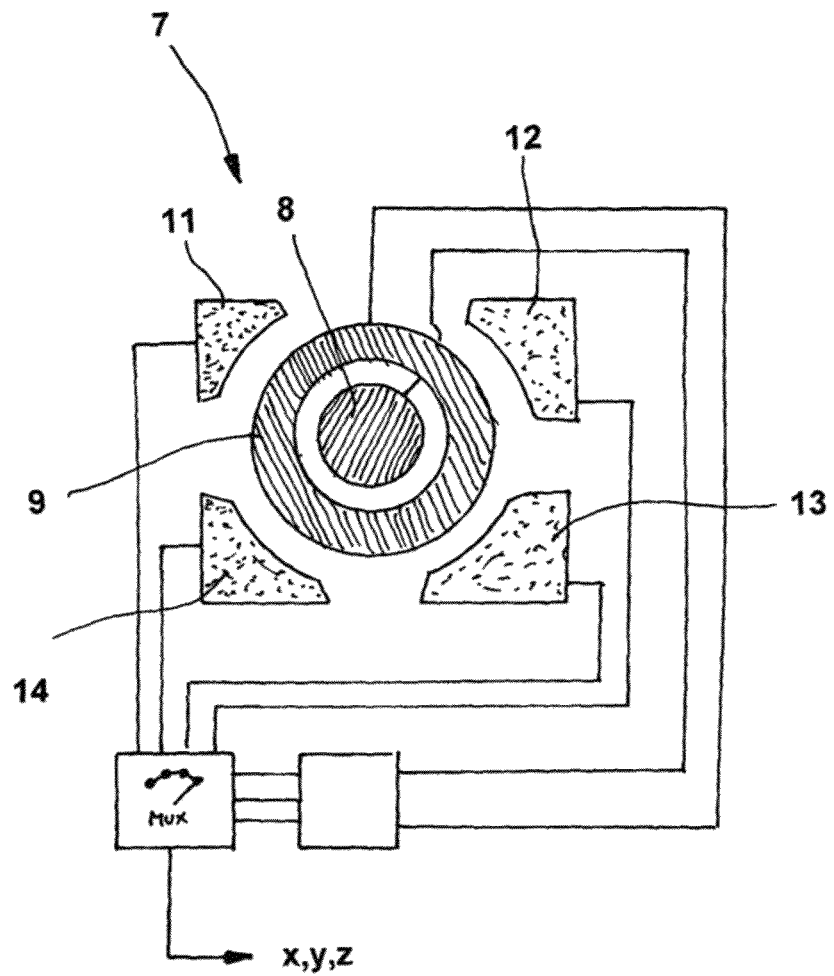
Figure 3:
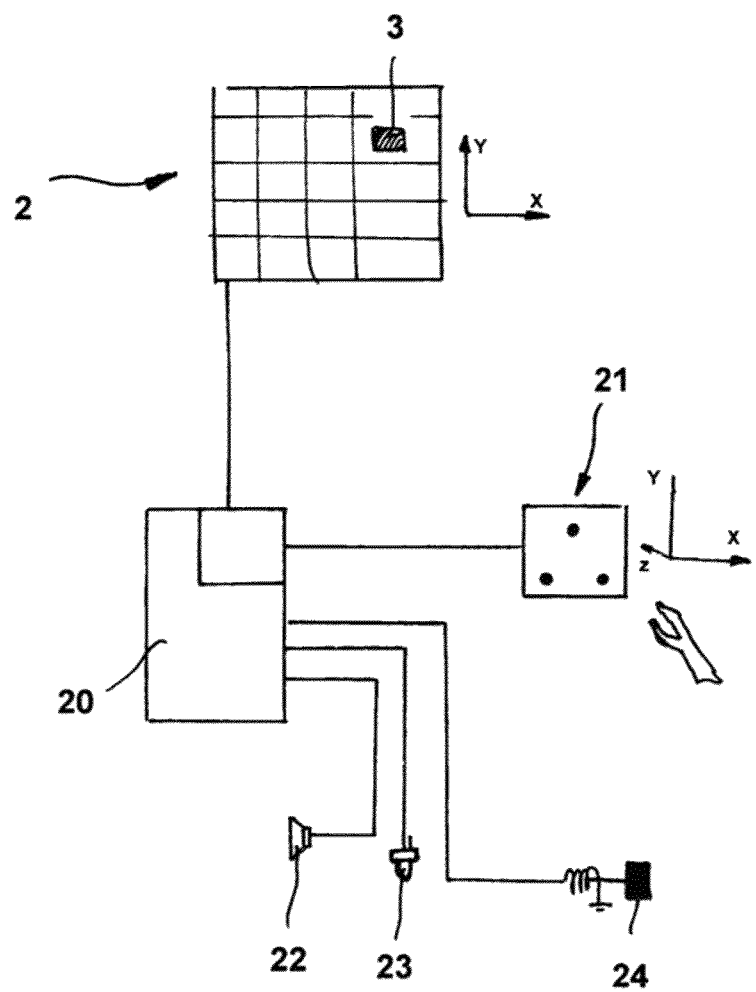
Figure 4:
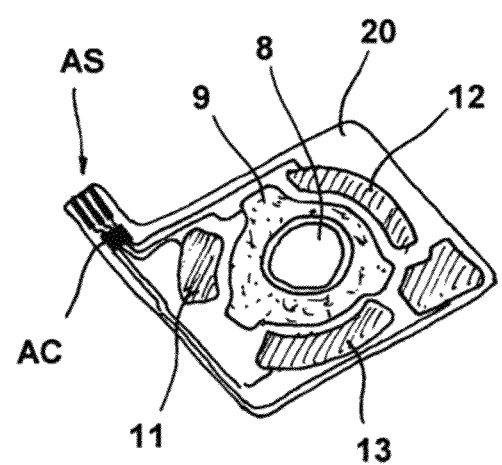

Further particulars and features of the invention result from the following description in association with the drawing. The figures show:

FIG. 1 a perspective view of a mobile communication device according to the invention together with the virtual input top surface provided by this communication device for input operations, FIG. 2 an elementary circuit diagram to illustrate the structure of an electrode device for detecting the movement of the operating hand as to the communication device, FIG. 3 a schematic representation to illustrate the circuit design structure of a mobile communication device according to the invention;

FIG. 4 an input device according to the invention formed as a prefabricated construction group for a communication device, that comprises as such a thin logic board card structure with electrode surfaces on it, in which on this logic board card structure an ASIC-switching is arranged, for generating the command signals on the basis of the approximation effects detected by the electrode surfaces.

Figure 5:
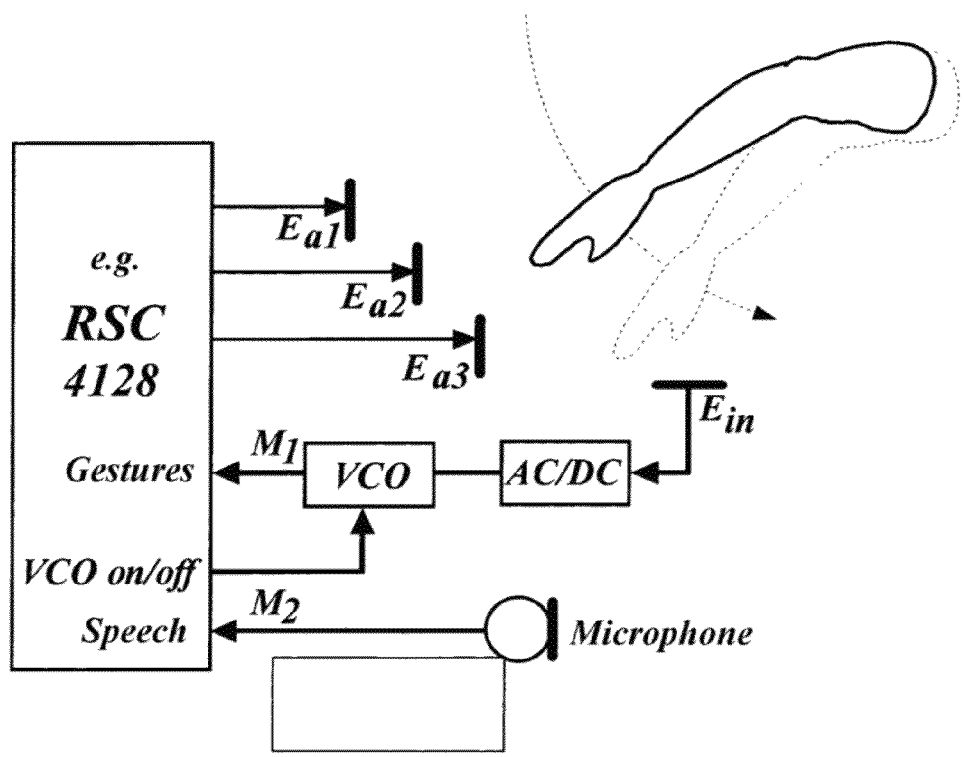

FIG. 5 a schematic representation to illustrate the gesture detection concept according to the invention, in which the spatial movement of a hand is detected by three transmission electrodes and a reception electrode, and that the signal detected by the reception electrode is generated or modified in such a way that it can be detected in a sufficiently unequivocal way by means of a voice recognition system;

The mobile communication device represented in FIG. 1 comprises a display 2 that in this embodiment is a flat-screen monitor.

The mobile communication device 1 in this embodiment as for its outer design resembles a high-quality mobile communication device, especially an I-Phone telephone.

By the display 2 a graphical user interface is illustrated, that as such offers several operational windows, in which inside the respective operational window a two-dimensional navigation of a cursor 3 or of an otherwise striking color structure is possible.

The mobile communication device shown here is configured in such a way that it can be served with normal seizing, by performing, with the remaining free hand R (here only typically the right hand) by moving without contact the hand or the stretched forefinger F on the virtual input plane E represented here, cursor movements or selection processes within the user interface provided by the display 2.

In the embodiment shown here the system tuning is done in such a way that the width B as well as the length L of the virtual input plane E is greater than the width B and the length L of the display 2.

In this way input movements are possible that are far greater than the size of the display. The input device of the mobile communication device 1 is moreover configured in such a way that selection operations, especially by striking movements of the operating hand R or the finger F, in a direction normal as to the input plane E can be done (z-direction).

Moreover the mobile communication device 1 is equipped with input devices in the form of pushbuttons 4, 5, by means of which further input operations can be induced.

The mobile communication device 1 is configured in such a way that on the display 2 is directly shown, which positioning of the cursor 3 within the display 2 is induced by the momentary position of the input hand R. It is possible to do reset processes on the pushbuttons on the device 4, 5, which entail that the momentary position of the operating hand R as to the mobile communication device 1, e.g. is interpreted as zero position, which for example entails that the cursor 3 lies substantially centrally in the display 2. It is possible to form the communication device 1 moreover in such a way that the width B and if necessary also the length L of the virtual input field E used for generating the input instructions can be scanned by a teaching mode, for example by moving the operating hand R in a determined key sequence, e.g. simultaneous pressure of the press buttons 4 and 5, first to the extreme left, then to the extreme right, in the following to the top and at the end to the bottom.

By the mobile communication device represented here 1 reliable and rapid-coordination input operations can be done without contact and by relative gross motor movement of the operating hand R in the virtual input field E and be directly represented in the small compact display 2.

The detection means for detecting the movement of the operating hand R are preferably directly integrated into the communication device 1. This detection means can especially be formed in such a way, that the movement and position of the operating hand R is detected on the basis of electric field interaction effects.

It is possible, in accordance with the hand and finger movement, to create a cursor structure inside the reproduction area of the display. It is also possible, in accordance with the hand and finger movement, to move determined menu points each time into the central area of the display, and to select them when entering into the central window. It is also possible to combine both these approaches so that e.g. when reaching a determined edge-border zone, e.g. a borderline extending with a distance of ca. 20% of the image area diagonal as to the display edge there is an image area run-on and then in the run-on window again a X-Y navigation can be done and where applicable also a Z-zoom.

The input device can be formed in such a way that it also interprets certain finger gestures, like those that result in writing on a virtual keyboard. The display 2 can be additionally formed as a touchscreen.

In FIG. 2 an electrode structure is illustrated that is preferably applied directly below a nonconductive housing surface of the communication device 1 near the display. By this electrode structure 7 it is possible to detect the X- and Y-movements as well as the Z-movements of the operating hand R (FIG. 1) as to the mobile communication device 1 and to generate the X/Y and, if any, Z-signals necessary for navigation within the user interface.

The electrode structure 7 comprises a feeding electrode device 8, a shield electrode device 9 and several detection electrodes 11, 12, 13, 14. By the feeding electrode device 8 a modulated E-field is generated, that expands into the area in front of the communication device 1 which is accessible to the operating hand R. The shield electrode device 9 prevents a direct field-electrical coupling of the field generated by the feeding electrode 8 with the detection electrodes 11, 12, 13, 14. By the field electrodes 11, 12, 13, 14 the position of the operating hand R as well as the relative movement of the same as to the feeding electrode 8 can be detected. The detection electrodes 11, 12, 13, 14 are attached for this purpose to an evaluation circuit, which preferably on the basis of several different evaluation concepts evaluates the detection events, especially the strength of the electric field adhering at the respective detection electrode 11, 12, 13, 14. The detection electrodes 11, 12, 13, 14 preferably form components of LC-nets. The evaluation concepts can especially contain the measurement of currents, tension, phasing of current and tension towards each other, as well as the phasing towards exciting systems, and capacities in the corresponding sections of the LC-network.

FIG. 3 shows in a highly simplified way the basic structure of the circuit structures provided for the input processes of the communication device 1. The display 2 is triggered by the programmed electronic controller 20. This triggering of the display 2 is done in the embodiment represented here in such a way that on the user interface 2 a user interface is formed that is advantageous for the realization of input process and preferably intuitively rapidly understandable. This user interface can be especially structured in such a way that it forms several windows, in which at least a part of these windows is configured in such a way that in these windows a two-dimensional shifting of a cursor structure, or accordingly another two-dimensional navigation, is possible. The X/Y information for shifting the cursor structure 3 within the image area are generated according to the invention by the detection means 21 which is included directly into the mobile communication device 1. This detection means 21 is configured in such a way, that it makes possible the movement of an operating hand in an operating space in front of the mobile communication device 1 on the side of the display (cf FIG. 1). In the embodiment shown here the input device 21 is configured in such a way that it detects the X/Y movement of the operating hand R of an user as to the input device 21. This movement is preferably visualized directly by a corresponding movement of the cursor structure 3 in the display of the mobile communication device 1. The mobile communication device 1 in this embodiment comprises further output structures, i.e. a loudspeaker device 22 for generating acoustic signals, additional LED means 23 for generating additional optical signals and preferably also a pulse actuator 24 for generating haptic signals. In the embodiment shown here for example the movement of the operating hand R as to the input device 21 leads to a shifting of the cursor structure 3, in the user interface provided by the display 2. When selecting corresponding menu items, the loudspeaker device 2 generates an acoustic signal correlating with it, especially a keystroke sound or a beep signal defined by sound design. By means of the light-emitting diode device 23 also certain device states can be visualized, e.g. the readiness of the device for performing input processes, as well as especially certain menu levels. For example it is possible to arrange an optical scrollbar generated by a LED chain at the communication device 1, so that on the basis of this optical scrollbar it can be indicated directly in which user window plane the users is at the moment. This user level can be processed for example by varying the distance of the operating hand R in z-direction (substantially perpendicular to the device surface or perpendicular to the operational plane E).

When selecting certain keys inside the graphic user window, by means of the actuator device 24 a small pulse event can be generated that additionally signals to the user that now a menu item has been selected.

On the basis of the concept according to the invention there is the possibility to use a one-hand mobile phone without contact by moving the user's remaining free hand over it, in which a relatively fine menu window with number and letter fields can be processed by a movement relatively good to be coordinated of the user's free hand as to the mobile communication device and especially without touching it with the input hand.

The concept according to the invention is not limited to the use with mobile phones. It is especially suitable also for operating digital cameras, Gameboys and Playstations and other powerful small electronic devices that as such seized can be with one hand and are typically operated by the user's other hand.

FIG. 4 shows an input device according to the invention formed as a prefabricated construction group for a communication device, that comprises as such a thin logic board card structure 20 with electrode structures on it 8, 9, 11, 12, 13, in which on this logic board card structure an ASIC-switching AC is arranged, for generating the command signals on the basis of the approximation effects detected by the electrode device. These command signals can be made available in a standardized signal standard, especially USB standard by means of the connecting structures AS.

It is possible to combine the system according to the invention for gesture and hand movement detection without contact also with contact detection systems, especially touch screen systems. Also additional entry information by inertial sensors, especially gyrometers can be processed in combination with the detection concept according to the invention in the field of handsets for performing input operations.

FIG. 5 visualizes a first variant of a gesture conversion circuit according to the invention. An electronic component that is basically suitable and equipped for speech processing (e.g. the module RSC 4128) comprises a programmable controller. The latter is instructed by firmware to generate a changing signal on at least one IO-port (1-0 sequence). This signal can be emitted either optically, e.g. by light-emitting diodes, or also capacitively, e.g. on a coupling surface. In the latter case it generates an electrical alternating field. A detector preferably equipped with a transimpedance amplifier can receive this field or a quantity of light originating from the light-emitting diode. This is changed into a DC voltage that runs a tension controlled oscillator VCO. A change of the luminosity or the electric field, e.g. by introducing human limbs in the coverage area, changes the pitch. It can sink or rise. If the corresponding controller pin is activated only momentarily (e.g. 40 milliseconds), also the tone change will take place only in this time. In the end the respective VCO can be switched on or off by another IO pin, so that in the idle state no tone can be heard. The tone sequence generated by approach is conducted to the analysis circuit normally foreseen for speech processing, that consists typically of a combination of hardware and software, precisely preferably in the same chip that also generates the field or light signal. If one wants to detect several dimensions, if necessary several field-forming electrodes or light-emitting diodes are provided. This can happen with the help of other IO pins of the same controller that can be activated one after the other (=sequence). As an alternative to the aforementioned detection concepts it is also possible to detect the gesture by an optical-mouse system or other camera devices, especially where applicable a camera in the mobile phone.

The signal processing and evaluation according to the invention is done by in principle common analysis techniques for speech processing. These speech recognition techniques are used according to the invention for gesture detection in that first in correlation with the gestures, especially the form of the gesture object (hand and/or fingers), the trajectory and dynamics, sound-like, language-like signal sequences are formed. The evaluation of these sound-like signal sequences is relatively reliable, as the tone can be generated in such a way that it for example rather appear as a sequence of vowels and consonants, and sibilants may (but do not have to) be missing. In this way it is also possible to mix linguistic commands and gesture commands with each other and to execute them at the same time or one after the other. With the help of neuronal networks or other learning algorithms it is possible to train such a system and to adjust tolerance thresholds.

In the electronic module represented in FIG. 5 for example three field-forming electrodes (e.g. copper surfaces) are connected to its IO ports. In its proximity a sensing electrode is situated. It is illustrated at a buffer (e.g. transimpedance amplifier), a following rectifier circuit consisting of diode and condenser, and a tension controlled oscillator (VCO, here a needle pulse generator). With the help of this circuit it is possible to generate tone sequences (tone sequences), that by approach, preferably that of human limbs, are modified in their height. With the help of a sequencer circuit (software or hardware) now the single electrode surfaces E1 to E3 are activated one after the other, precisely with an alternating field consisting of 1-0 successions of temporal length, e.g. 100 kHz for each 20 milliseconds. Electric alternating fields arise. Introducing limbs can attenuate the field to the entry electrode surface Ke or act as a bridge. Both effects vary the pitch of the switched-on VCO. Its exit is led back into the chip, where the speech processing is integrated. Thus a sequence of movements can be simply trained and evaluated. To the same (or another entry) also a microphone can be connected that processes linguistic commands in the same way.

The invention can be realized extremely economically and allowed in case of mobile communication devices to realize language and gesture detection in a synergistic way.

The invention claimed is:

1. A mobile communication device comprising:
   a housing of such a size that it can be held in one hand,
   a display integrated into the housing for providing an image reproduction surface,
   a controller for activating the display in such a way that it in an input mode provides a user interface that assists the realization of an input procedure, and
   an input device for carrying out the input procedure in accordance with input actions of a manual type,
   wherein the input device is configured such that when handling the device as intended, in an area placed in front of the display an input zone is provided within which input operations can be done by a user by performing control movements with his free hand with respect to the housing without touching the display or the mobile communication device with this hand, wherein a length and width of the display is smaller than a length and width of the input zone, and
   wherein the input device comprises an electrode structure comprising a central transmitter electrode comprising an electrode plate for generating a low frequency electric field and a first, a second and a third receiving electrode plates surrounding the transmitter electrode and configured to detect a low frequency electric field generated by the transmitter electrode and wherein at least one of a position of the free hand and a movement of the free hand within the input zone is detected by analyzing differences between signals received from said at least three electrodes plates.

2. The mobile communication device according to claim 1 wherein the controller is configured in such a way that the control movements performed by the user are reflected in the user interface visualized by the display.

3. The mobile communication device according to claim 1 wherein the user interface is configured in such a way that by a transverse movement of the free hand with respect to the mobile communication device different buttons can be selected.

4. The mobile communication device according to claim 1 wherein the user interface is configured in such a way that by a lengthwise movement of the operating hand different buttons can be selected.

5. The mobile communication device according to claim 1 wherein by a depth movement different menu windows of the user interface can be selected.

6. The mobile communication device according to claim 1 wherein by a depth movement different menu windows or frames can be selected.

7. The mobile communication device according to claim 1 wherein by means of a depth movement the zoom factor of the user interface visualized by the display is tuned.

8. Mobile communication device according to claim 1 wherein the user's free hand by means of longitudinal and transverse movements navigates inside a window or a frame.

9. Mobile communication device according to claim 1 wherein a selection command is derived from an event generated by a predetermined movement of the free hand.

10. The mobile communication device according to claim 9 wherein the selection command is generated by a finger movement, especially a tilting of one or several fingers of the operating hand towards the display.

11. The mobile communication device according to claim 1 comprising an input unit, for selecting an operating mode by corresponding actuation of the input unit.

12. The mobile communication device according to claim 11 wherein the input unit comprises a button that when seizing the mobile communication device as intended can be operated by a finger or thumb of the seizing hand.

13. The mobile communication device according to claim 11 wherein the input unit comprises an electrode structure for detecting the input operations on the basis of electric field interaction effects.

14. The mobile communication device according to claim 1 further comprising a shielding electrode arranged between the transmitter electrode plate and the receiving electrode plates.

15. The mobile communication device according to claim 14 wherein the shielding electrode forms a ring around the transmitter electrode between the transmitter electrode and the surrounding receiving electrodes.

16. The mobile communication device according to claim 15 wherein the four receiving electrode plates are arranged in four corners of a rectangle around the transmitter electrode plate.

17. The mobile communication device according to claim 1 comprising in a rearward area a coupling electrode for coupling a predetermined signal into the seizing hand of the user which can be detected by the receiving electrode plates.

18. The mobile communication device according to claim 1 comprising a loudspeaker device, especially a piezo loudspeaker, for generating an acoustic feedback during the realization of the input operations.

19. The mobile communication device according to claim 1 comprising a device for generating a haptic feedback.

20. The mobile communication device according to claim 1 comprising a device for generating an optical feedback.

21. An input device for a communication device according to claim 1, further comprising
   a thin logic board card structure comprising the electrode structure with a transmitting electrode plate surrounded by at least three receiving electrode plates, wherein the logic board card structure further comprises an ASIC device for generating command signals on the basis of approximation effects detected by the electrode structure.

22. The mobile communication device according to claim 1, wherein the low frequency electric field has a frequency of about 100 kHz.

23. The mobile communication device according to claim 1, wherein the first, second and third receiving electrode plates are arranged in circular fashion around said central transmitter electrode.

24. A method for determining an input during the use of a mobile communication device wherein the mobile communication device comprises:

a housing that is formed in such a way that it can be seized with one hand, a display that is integrated into the housing for providing an image reproduction surface, a controller for activating the display in such a way that it in an input mode provides a user interface that assists the realization of an input procedure, and an input device for carrying out the input procedure in accordance with input actions of a manual type, wherein the input device comprises an electrode structure comprising a central transmitter electrode comprising an electrode plate for generating a low frequency electric field and a first, a second and a third receiving electrode plate surrounding the transmitter electrode and configured to detect a low frequency electric field generated by the transmitter electrode and wherein at least one of a position of the free hand and a movement of the free hand within the input zone is detected by analyzing differences between signals received from said at least three electrode plates, the method comprising the step of:

while holding the mobile communication device by one hand of user, generating an electric field above the display;

detecting by means of said receiving electrode plates in an area placed in front of the display, variations of said electric field within an input zone within which input operations are done by a user by performing control movements with his free hand with respect to the housing, without touching the display or the mobile communication device with this hand.

25. The method according to claim 24, wherein detecting an input performed by the holding hand of the user wherein the holding hand presses a button arranged within the mobile communication device.

26. The method according to claim 24, comprising
displaying a user interface on the display wherein control movements performed by the user are reflected in the user interface.

27. The method according to claim 24, wherein the low frequency electric field has a frequency of about 100 kHz.

* * * * *